Figure 1:
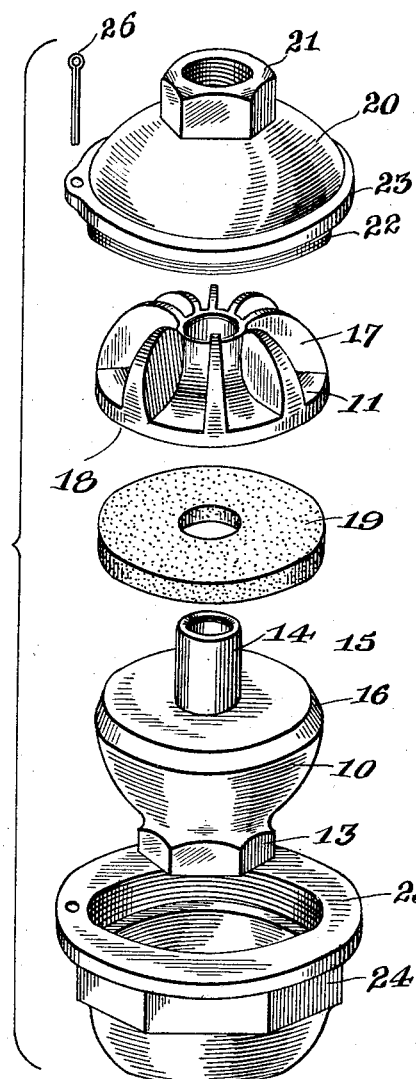

April 21, 1931. W. C. WHITE 1,801,892

FLEXIBLE PIPE JOINTS

Filed Oct. 26, 1927

Inventor
W. C. White
By Lacey & Lacey,
Attorneys

Patented Apr. 21, 1931

1,801,892

UNITED STATES PATENT OFFICE

WALTER C. WHITE, OF LOS ANGELES, CALIFORNIA, ASSIGNOR TO INTERNATIONAL COUPLERS CO., OF PITTSBURGH, PENNSYLVANIA, A COMMON-LAW TRUST

FLEXIBLE PIPE JOINT

Application filed October 26, 1927. Serial No. 228,954.

This invention relates to an improved flexible pipe joint particularly designed for use in connection with fluid pressure systems and has as one of its principal objects to provide a metallic joint wherein no leakage whatever will occur.

The invention has as a further object to provide a joint not only wherein fluid pressure will act to compress and feed the sealing gasket employed to the wall of the joint socket so as to be constantly impacted thereagainst for forming a sealed joint between the socket and the ball of the joint but wherein the gasket will, by being capable of swelling, urge the coacting sections of the ball into tight frictional contact with the socket while at the same time itself bulging against the wall of the socket to further insure a sealed joint between the ball and the socket.

A further object of the invention is to provide a joint wherein the factor of weight will be reduced practically to a minimum consistent with efficiency so that the construction will be especially adapted for large joints.

Figure 2:
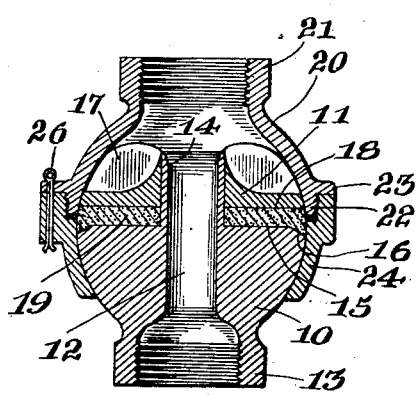
Figure 3:
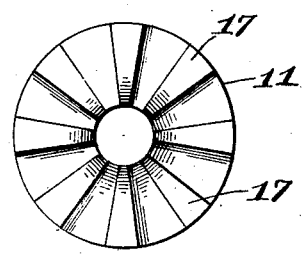
Figure 4:
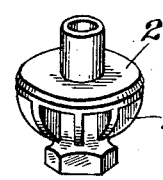

Other and incidental objects will appear hereinafter. In the drawings:

Figure 1 is a perspective view showing my improved pipe joint disassembled, the parts, however, being in proper relative position, Figure 2 is a sectional view showing the joint assembled, Figure 3 is a plan view showing one section of the ball of the joint in detail, this section being employed as a follower as shall presently appear, and Figure 4 is a detail perspective view showing a slightly modified form of body section of the joint ball.

The joint of the present invention is of the ball and socket type. The ball is of sectional construction and includes a substantially semispherical body section 10 with which mates a cap section 11. Formed centrally through the body section is a passage 12 at the outer end of which is a pipe nipple 13 and surrounding this passage at its inner end is an annular centering flange or guide 14 upstanding from the flat face 15 of the section. As will be observed, the face 15 is arranged at right angles to the axis of the passage 12 and surrounding said face at the periphery of the section is an annular beveled face or shoulder 16 sloping outward away from the ball section 11. This ball section 11 is provided axially with a bore therethrough which snugly but slidably receives the flange 14 so that the section 11 may shift axially with respect to the section 10 but will be coupled to the body section to move in unison therewith. At its outer face the section 11 is cut away, preferably at regular intervals, to provide a plurality of segmental fins or webs 17. The weight of the section is thus materially reduced. The fins are provided with curved outer edges conforming to the spherical contour of the ball and since these edges are widest adjacent the bases of the fins they will present the greatest bearing area adjacent the medial horizontal plane of the ball. At its inner end the section 11 is provided with a flat face 18 confronting the flat face 15 of the body section and interposed between these flat faces is a packing or gasket 19 snugly surrounding the flange 14. The packing may be formed of any approved material but is compressible as well as subject to swelling due to liquid absorption and, at its peripheral margin overlies the shoulder 16 of the body section while the peripheral edge of the packing is shaped to conform to the spherical contour of the ball. In this connection it is to be noted that the packing is of a thickness to complete the spherical shape of the ball.

Snugly receiving the ball is the joint socket. This socket includes a socket cup 20 provided with a pipe nipple 21 corresponding to the nipple 13 of the ball. Formed on the cup is a flange 22 at the inner end of which is provided a stop shoulder 23 and threaded upon the flange is an annular socket nut 24 abutting the stop shoulder 23. This socket nut is formed with a suitable enlarged wrench receiving portion surmounted by a flange 25 and engaged through said flange and through the shoulder 23 is a key 26 locking the nut and socket cup together. The socket nut conforms, of course, to the shape of the cup and the inner faces of the nut and cup are machined to provide smooth and close fitting contact between the ball and socket.

The section 11 of the ball being free to move axially with respect to the section 10, this section 11 is adapted to provide a follower for the packing 19 so that in use, fluid pressure will act against this follower for compressing the packing and feeding the packing toward the wall of the socket so as to firmly impinge thereagainst and provide a sealed joint between the ball and the socket. Cutting away of the section 11 forms the fins 17, and depressions between the fins, which latter afford enlarged areas for receiving fluid pressure thereagainst, so that the follower will be urged with correspondingly increased force against the packing to in turn feed the packing to the socket wall. Compression of the packing into the passage 12 will be prevented by the flange 14. On the other hand, the beveled shoulder 16 will tend to assist in feeding the packing to the wall of the socket while, owing to the presence of said shoulder, the area of the packing contacting with the socket wall will be materially widened. In connection with this mechanical feeding of the packing for forming a tight joint between the ball and socket, swelling of the packing, due to liquid absorption, will result in the packing itself bulging against the socket wall and exerting a pressure tending to constantly urge the sections into close fitting contact with the wall of the socket to further insure a sealed joint between the ball and the socket. For a reason which will thus be apparent, the outer edges of the fins 17 are thicker or wider adjacent the bases of the fins since the base portions of the fins will normally be held in contact with the socket wall.

In Figure 4, I have shown a modified body section 27 for the ball of the joint. This body section is identical with the body section of the preferred construction with the exception that the body section 27 is formed with fins 28 similar to the fins 17 of the section 11 for reducing the weight of the section.

Having thus described the invention, what is claimed as new is:

A flexible pipe joint including a ball formed of coacting sections, one movable relative to the other, one section having a tubular guide, the other section having a pressure supporting hub slidably engaging the guide, the outer face of said hub being cut away to provide radially disposed fins having their inner ends merged with the hub, the outer edges of said fins being curved, depressions between said fins, which depressions afford enlarged areas for receiving fluid pressure thereagainst, a socket receiving the ball and engaged by the curved edges of the fins, and a packing interposed between the sections.

In testimony whereof I affix my signature.

WALTER C. WHITE. [L. S.]